United States Patent
Barrus

(10) Patent No.: US 8,788,930 B2
(45) Date of Patent: Jul. 22, 2014

(54) AUTOMATIC IDENTIFICATION OF FIELDS AND LABELS IN FORMS

(75) Inventor: John W. Barrus, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 72 days.

(21) Appl. No.: 13/414,712

(22) Filed: Mar. 7, 2012

(65) Prior Publication Data

US 2013/0238965 A1    Sep. 12, 2013

(51) Int. Cl.
*G06F 17/21* (2006.01)
*G06F 17/22* (2006.01)

(52) U.S. Cl.
USPC ............................................. 715/223; 717/123

(58) Field of Classification Search
CPC .................................................... G06F 17/243
USPC .................................................. 715/223; 717/123
See application file for complete search history.

(56) References Cited

U.S. PATENT DOCUMENTS

| | | | |
|---|---|---|---|
| 5,410,611 A * | 4/1995 | Huttenlocher et al. | 382/177 |
| 5,594,809 A * | 1/1997 | Kopec et al. | 382/161 |
| 5,615,367 A * | 3/1997 | Bennett et al. | 1/1 |
| 6,081,620 A | 6/2000 | Anderholm | |
| 6,397,215 B1 | 5/2002 | Kreulen et al. | |
| 6,597,802 B1 * | 7/2003 | Bolle et al. | 382/124 |
| 6,816,630 B1 | 11/2004 | Werth et al. | |
| 6,912,308 B2 * | 6/2005 | Reintjes et al. | 382/181 |
| 2002/0067854 A1 * | 6/2002 | Reintjes et al. | 382/199 |
| 2005/0289114 A1 * | 12/2005 | Bellamy | 707/2 |
| 2006/0159345 A1 * | 7/2006 | Clary et al. | 382/186 |
| 2007/0089049 A1 * | 4/2007 | Gormish et al. | 715/507 |
| 2007/0133876 A1 * | 6/2007 | Chande et al. | 382/181 |
| 2007/0286486 A1 * | 12/2007 | Goldstein | 382/187 |
| 2009/0094538 A1 * | 4/2009 | Ringler | 715/760 |
| 2009/0226090 A1 | 9/2009 | Okita | |
| 2009/0254803 A1 * | 10/2009 | Bayne | 715/222 |
| 2010/0328115 A1 | 12/2010 | Binnig et al. | |

OTHER PUBLICATIONS

Bargas-Avila et al., "Working towards Usable Forms on the World Wide Web: Optimizing Date Entry Input Fields", ACM, pp. 1-8.*
Non-Final Office Action for U.S. Appl. No. 13/415,766 dated Aug. 27, 2013, 16 pages.

* cited by examiner

*Primary Examiner* — James J Debrow
(74) *Attorney, Agent, or Firm* — Patent Law Works LLP

(57) ABSTRACT

A system and method for processing form images including strokes. A controller receives a plurality of form images including a plurality of strokes. A stroke identification module identifies the position of each stroke in each of the form images. A geometry engine generates an overlay of the plurality of form images and identifies a group of overlapping strokes from the overlay. The geometry engine generates a field bounding box encompassing the group of strokes, the field bounding box representing a field in the plurality of form images. The geometry engine crops a field image from each form image based on the size and position of the field bounding box. A label detector analyzes an area around the field image in the form image to determine a label and generates a label image.

20 Claims, 11 Drawing Sheets

300

| Last Name | | First Name |
| DOB | | SSN# |

Gender: ☐ Male ☐ Female    Marital Status: ☐ Single ☐ Married
☐ Widowed ☐ Divorced Dependents: ☐

Employer                    Title

Address

City            State           Zip

Phone           Email

Signature                   Date

⬭ ⟶ Labels

▭ ⟶ Fields

401  403
    405
Last Name  Oscar        First Name  Mike  —410

DOB  7/12/1980        SSN#  123-45-6789

Gender:  ☒ Male  ☐ Female

413                    ☐ → Stroke Bounding Box

441
    445
Last Name  Dagon        First Name  Jazz

DOB  12/10/1977        SSN#  987-65-4321

Gender:  ☑ Male  ☐ Female

Last Name  Greene        First Name  Brooke

DOB  11/12/1988        SSN#  123-45-3210

Gender:  ☐ Male  ☒ Female
                485

505 — Last Name ⟨scribble⟩  First Name ⟨scribble⟩ — 510
515 — DOB ⟨scribble⟩  SSN# ⟨scribble⟩ — 520
Gender: ☒ Male ☒ Female
525  530
413

545 — Last Name ⟨scribble⟩  First Name ⟨scribble⟩ — 550
555 — DOB ⟨scribble⟩  SSN# ⟨scribble⟩ — 560
Gender: ☒ Male ☒ Female
565  570

⌐ ─ ─ ─ ┐  → Field Bounding Box
└ ─ ─ ─ ┘

Figure 5B

AUTOMATIC IDENTIFICATION OF FIELDS AND LABELS IN FORMS

BACKGROUND OF THE INVENTION

1. Field of the Invention

The present invention relates to processing of forms. More particularly, the present invention relates to systems and methods for processing form images by generating an overlay of strokes from multiple forms to automatically identify fields, by detecting labels in the form images that are associated with fields and analyzing the fields and labels to increase accuracy.

2. Description of the Background Art

The use of portable computing devices has become commonplace for many users. In addition to having a conventional desktop computer, many users also have some type of portable computing device. Examples of present-day computing devices include electronic devices for reading such as the Reader from Sony Corp., the Kindle from Amazon and the Nook from Barnes & Noble. As memory size becomes smaller, people are increasingly foregoing laptops for tablets, such as the iPad from Apple Computer Inc., the Kindle Fire from Amazon and the Galaxy Tab from Samsung. Smaller portable computing devices such as smartphones are also useful because of their portability. Smartphones include the iPhone from Apple Computer Inc., the Droid from Motorola and the Blackberry from Research in Motion, just to name a few.

Portable computing devices can be used to input information into forms. Users will input information using a stylus and optical character recognition (OCR) or optical mark recognition (OMR) is applied to the strokes to convert them into text. One particular problem with this prior art approach, however, is that the process of converting the strokes into text is error prone and the user has no way of knowing that the conversion to symbolic data is incorrect. In addition, many items on the forms are needlessly run through the OCR or OMR process when only a certain subset of the strokes needs to be converted. Lastly, the forms are typically processed by identifying the form, extracting information about the fields and performing actions on the form. This process is time consuming, complicated and can easily result in errors. As a result, the prior art provides a very complicated and problematic process for receiving data and analyzing forms.

SUMMARY OF THE INVENTION

The present invention overcomes the deficiencies of the prior art with a system and a method for processing form images including strokes. An Image Based Document Management (IBDM) server includes a controller, a stroke identification module, a geometry engine, a label detector, a table generator, a symbolic representation module, an image processor and a user interface engine. The controller receives a plurality of form images including a plurality of strokes. The stroke identification module identifies the position of each stroke in each of the form images. The geometry engine generates an overlay of the plurality of form images and identifies a group of overlapping strokes from the overlay. The geometry engine then generates a field bounding box encompassing the group of strokes, the field bounding box representing a field in the plurality of form images. The geometry engine then generates a field image from each form image based on the size and position of the field bounding box. In one embodiment, the label detector analyzes an area around the field image in the form image to determine a label and generates a label image. In one embodiment, the symbolic representation module generates a label match for the label image. The table generator indexes the label image, the label match and the field image with the form image.

In one embodiment, the invention includes receiving a plurality of form images, each form image including a plurality of strokes, generating an overlay of the plurality of images, generating a field bounding box encompassing the group of strokes, the field bounding box representing the field in each of the plurality of the form images, generating a field image from each of the plurality of form images based on the field bounding box and saving each field image in each form image in the data storage.

In one embodiment, the geometry engine removes stray markings from the plurality of form images. In one embodiment, the user interface engine generates graphical data for providing a user interface that includes the field images and the label images in a table.

In one embodiment, the invention includes receiving a first set of field images associated with a first field, retrieving a first label image associated with the first field, generating symbolic information for the first label image and generating symbolic information for the first set of field images based on the symbolic information of the first label image.

In one embodiment, the table generator receives field images associated with fields on a form image, determines a geometric relationship between the position of the field images, determines whether the geometric relationship has a specific property to associate the fields with each other and analyzes the strokes and label images to identify patterns.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 3 is a graphic representation of an example form.

FIGS. 4A-4C are graphic representations of form images including strokes that are received by the Image Based Document Management server.

FIG. 5A is a graphic representation of an overlay of form images including strokes.

FIG. 5B is a graphic representation of an overlay of form images including field bounding boxes encompassing groups of strokes.

DETAILED DESCRIPTION OF PREFERRED EMBODIMENTS

Figure 1:
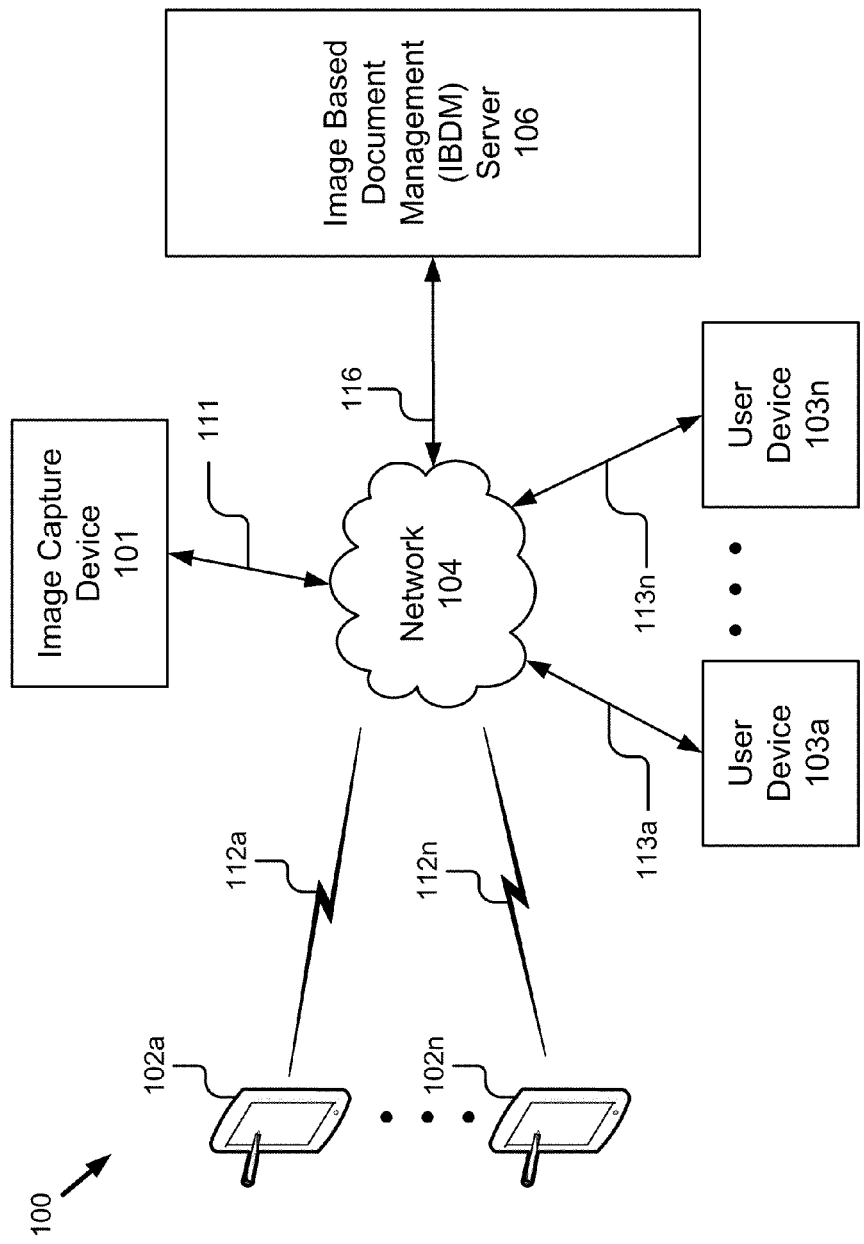
FIG. 1 is a block diagram illustrating one embodiment of a system for processing form images including strokes.

A system for processing form images including strokes is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to portable computing devices that are exemplified in a hardware and software platform such as Ricoh eQuill™. However, the present invention applies to any type of computing device that can capture strokes, data and commands, and send documents electronically.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described with reference to a particular programming language. It will be appreciated that a variety of programming languages may be used to implement the teachings of the invention as described herein.

System Overview

FIG. 1 shows an embodiment of a system 100 for processing form images including strokes. The illustrated embodiment of system 100 comprises: portable computing devices 102a-102n, user devices 103a-103n, an image capture device 101, a network 104 and an Image Based Document Management (IBDM) server 106. In FIG. 1 and the remaining figures, a letter after a reference number, for example "102a" is a reference to the element having that particular reference number. A reference number in the text without a following letter, for example "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 104 is coupled to the plurality of portable computing devices 102a-102n, the plurality of user devices 103a-103n, the image capture device 101 and the IBDM server 106, in practice any number of networks 104 can be connected to the entities.

The portable computing devices 102a-102n are each wirelessly coupled to the network 104 via signal lines 112a-112n respectively. The portable computing device 102 is any computing device including a memory, a processor and wireless communication capability. For example, the portable computing device 102 can be a tablet computer, a personal digital assistant, a smart phone, etc. The portable computing device 102 is adapted to receive form images, add stroke annotations to the form images and send the annotated form images to the IBDM server 106. A form is any document that includes fields (i.e., blank spaces) for insertion of required or requested information. The form when filled out with the requested information may be a statement, an order, a request, etc. For example, a form can be a tax form, an insurance form, a medical form, an electronic check, a job application, a survey, a receipt, etc.

FIG. 3 illustrates an example form 300 that includes a number of fields and the corresponding labels, such as last name, first name, employer, address, signature, etc. Labels are illustrated with small dashes and fields are illustrated with longer dashes. A user fills in a field by inputting strokes above the lines (e.g. printing or writing in cursive) or inputting strokes inside boxes (e.g. checks, x's and circles).

In one embodiment, the portable computing device 102 is a tablet computer including a computing pad and a stylus. The computing pad is adapted to display a form image and capture any strokes written on the form image using the stylus, a finger or other instrument for inputting stroke data. The strokes are typically displayed on top of the form image, just as if written by pen on paper. The computing pad usually captures the strokes as a sequence of points or segments along with location, timing and pressure information. The computing pad sends the form images including the captured strokes in any image format known to persons of ordinary skill in the art, for example, JPEG, JPEG2000, JPM, PNG, PDF, TIFF or simple portable bit map (PBM) file format, etc. The computing pad attaches the information associated with the strokes, for example, the location, the pressure profiles and timing information with the form images as metadata. The metadata can be attached in any format known to persons of ordinary skill in the art, including the Scaled Vector Graphics (SVG) format or the InkML format. The portable computing device 102 determines location information by using global positioning system (GPS) circuitry included within the device itself to determine its location. In one embodiment, the portable computing device 102 accesses a database including pairs of media access control (MAC) addresses and locations over the Internet. To determine a location, the portable computing device 102 only retrieves the location corresponding to the access point MAC address from the database.

The user devices 103a-103n are each coupled to the network 104 via couplings 113a-113n respectively. The user device 103 is any computing device that includes a memory and a processor, for example, a desktop computer, a laptop computer, etc. The user device 103 is adapted for sending and receiving data to and from the IBDM server 106. For example, the user device 103 sends a request for form images to the IBDM server 106. In this example, the user device 103 receives graphical data for displaying the requested form images as a table. The user device 103 is accessed by users that have permission to access information from the IBDM server 106, such as a creator of the form sent to portable computing devices 102 or an administrator of the IBDM server 106.

The image capture device 101 is coupled to the network 104 via signal line 111. Although only one image capture device is illustrated, persons of ordinary skill in the art will recognize that any number of image capture devices 101 can be coupled to the network 104. The image capture device 101 is adapted to capture an image of a printed form that includes strokes filled out using, for example a pen, pencil, etc., and send the printed form image to the IBDM server 106. In one embodiment, the image capture device 101 also sends an unmarked printed form image (i.e., an image of the printed form without any strokes) as metadata along with the captured image to the IBDM server 106. The image capture device 101 is for example, a scanner, a digital camera, a standard cellular camera phone, a webcam, a video recorder, etc.

The IBDM server 106 is coupled to the network 104 via signal line 116. In one embodiment, the IBDM server 106 receives form images including strokes from the portable computing devices 102a-102n and the image capture device 101, automatically identifies fields and labels in each of the form images and generates a database with field images and label images. Although only one IBDM server 106 is illustrated, persons with ordinary skill in the art will recognize that any number of IBDM servers 106 can be coupled to the network 104. The IBDM server is described in further detail below with reference to FIG. 2.

Image Based Document Management (IBDM) Server 106

Figure 2:
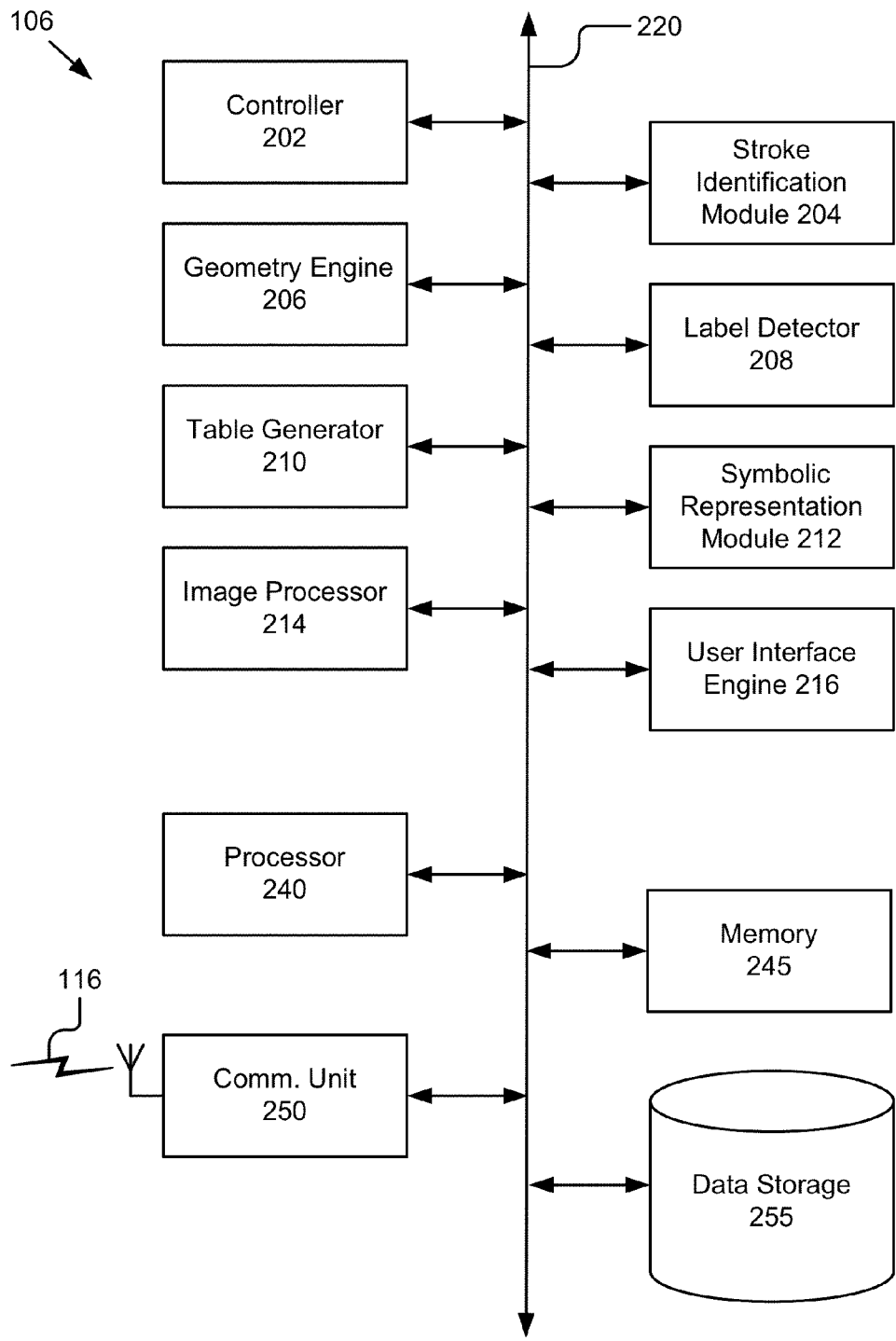
FIG. 2 is a block diagram illustrating one embodiment of an Image Based Document Management server in more detail.

Referring now to FIG. 2, an embodiment of the Image Based Document Management (IBDM) server 106 is illustrated. The IBDM server 106 includes a processor 240, a memory 245, a communication unit 250, data storage 255, a controller 202, a stroke identification module 204, a geometry engine 206, a label detector 208, a table generator 210, a symbolic representation module 212, an image processor 214 and a user interface engine 216.

The processor 240, the memory 245, the communication unit 250 and the data storage 255 are communicatively coupled to the bus 220. The bus 220 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations and provide electronic display signals to a display device. The processor 240 is coupled to the bus 220 for communication with the other components of the IBDM server 106. The processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 220 for communication with the other components of the IBDM server 106. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 250 is hardware for receiving and transmitting data by linking the processor 240 to the network 104 and other processing systems. The communication unit 250 receives data such as form images from the plurality of portable computing devices 102a-102n and the image capture device 101. The communication unit 250 also receives requests for form images from the plurality of user devices 103a-103n. The communication unit 250 transmits information to the plurality of user devices 103a-103n. For example, the communication unit 250 transmits graphical data for displaying form images as a table to the user device 103. The communication unit 250 is coupled to the bus 220 for communication with the other components of the IBDM server 106.

In one embodiment, the communication unit 250 includes a port for direct physical connection to the user devices 103, the portable computing devices 102, the image capture device 101 or to another communication channel. For example, the communication unit 250 includes an RJ14 or similar port for wired communication with the image capture device 101. In another embodiment, the communication unit 250 includes a wireless transceiver for exchanging data with the portable computing devices 102 or any other communication channel using one or more wireless communication methods, such as IEEE 802.11, IEEE 802.16, Bluetooth® or another suitable wireless communication method.

In yet another embodiment, the communication unit 250 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 250 includes a wired port and a wireless transceiver. The communication unit 250 also provides other conventional connections to the network for distribution of files and/or media objects using standard network protocols such as TCP/IP, HTTP, HTTPS and SMTP as will be understood to those skilled in the art.

The data storage 255 is a non-transitory memory that stores data for the functionality of the IBDM server 106. The data storage 255 is coupled to the bus 220 for communication with other components of the IBDM server 106. The data storage 255 stores form images received from the portable computing devices 102 and the image capture device 101, field images, label images, metadata associated with the field and label images including positions of the field images, thresholds for defining relationships between field and label images, a label database, etc.

The controller 202 is software and routines for handling communications between the components of the IBDM server 106 and other components of the system 100. In one embodiment, the controller 202 is a set of instructions executable by the processor 240 to provide the functionality described below for handling communications between the components of the IBDM server 106 and other components of the system 100. In another embodiment, the controller 202 is stored in the memory 245 and is accessible and executable by the processor 240. In either embodiment, the controller 202 is adapted for cooperation and communication with the processor 240, the communication unit 250, the stroke identification module 204, the image processor 214, the user interface engine 216 and other components of the IBDM server 106 via the bus 220.

The controller 202 receives information via the communication unit 250 and transmits the information to the appropriate component of the IBDM server 106. For example, the controller 202 receives form images from the portable computing device 102 and transmits the form images to the stroke identification module 204. In another example, the controller 202 receives printed form images from the image capture device 101 and transmits the printed form images to the image processor 214. In another example, the controller 202 receives a request for the form images from the user device 103 and transmits the request to the table generator 210.

The controller 202 also receives information from other components of the IBDM server 106 and transmits the information to the appropriate device in the system 100 via the communication unit 250. For example, the controller 202 receives graphical data for generating a user interface from the user interface engine 216. The controller 202 transmits the graphical data to the user device 103.

The stroke identification module 204 is software and routines for identifying strokes in a form image. In one embodiment, the stroke identification module 204 is a set of instructions executable by the processor 240 to provide the functionality described below for identifying strokes in a form image. In another embodiment, the stroke identification module 204 is stored in the memory 245 and is accessible and executable by the processor 240. In either embodiment, the stroke identification module 204 is adapted for cooperation and communication with the processor 240, the controller 202, the geometry engine 206, the image processor 214, and other components of the IBDM server 106 via the bus 220.

In one embodiment, the stroke identification module 204 receives form images including strokes from the controller 202. The stroke identification module 204 identifies pixels in a form image that represent strokes based on, for example, the pixel intensities, the color of the pixels, etc. The stroke identification module 204 also determines the position (for example, an x-y coordinate) of a stroke in the form image. In one embodiment, the stroke identification module 204 receives metadata along with the received form image that includes position information of the strokes in the form image, when the stroke was input, the identity of the user that input the stroke, etc. The stroke identification module 204 identifies the position of each stroke in the form image based on the metadata.

Referring now to FIGS. 4A-4C, graphic representations of form images 400, 440, 480 received by the stroke identification module 204 are illustrated. In the illustrated examples, the form images 400, 440, 480 include strokes filled out on form 300 (see FIG. 3) by three different users using the portable computing device 102. The stroke identification module 204 identifies the strokes, (for example, the strokes that form the letters O 401, s 403, D 441, etc.) from the form images 400 and 440 and the position of each stroke in the form images 400 and 440.

The stroke identification module 204 then generates a stroke bounding box for a set of strokes in a single form image. In one embodiment, the stroke identification module 204 identifies strokes that overlap each other in the form image based on the position of the strokes and generates the stroke bounding box. Each stroke bounding box should be unique and not overlap much with other stroke bounding boxes. The stroke identification module 204 generates the stroke bounding box based on the distance between the strokes in the form image. In this embodiment, the distance between the positions of each stroke is within a threshold. In the above illustrated examples, the stroke identification module 204 generates stroke bounding boxes for the sets of strokes that form the words Oscar 405 and Mike 410 (see FIG. 4A), Dagon 445 (see FIG. 4B), the set of strokes that forms the X mark 485 (see FIG. 4C) etc.

In another embodiment, the stroke identification module 204 determines a set of strokes based on the timing information of the strokes received as metadata with a form image.

For example, the stroke identification module 204 generates a stroke bounding box for a set of strokes that were filled out at the same time. The stroke identification module 204 sends the form images, the position and size of each stroke bounding box in each form image to the geometry engine 206. Turning back to FIG. 2, the geometry engine 206 is software and routines for identifying a field in the form images and generating field images. In one embodiment, the geometry engine 206 is a set of instructions executable by the processor 240 to provide the functionality described below for identifying a field in the form images and generating field images. In another embodiment, the geometry engine 206 is stored in the memory 245 and is accessible and executable by the processor 240. In either embodiment, the geometry engine 206 is adapted for cooperation and communication with the processor 240, the stroke identification module 204, the label detector 208, the table generator 210 and other components of the IBDM server 106 via the bus 220.

The geometry engine 206 receives form images and the size and position information of the stroke bounding boxes in each form image from the stroke identification module 204. In one embodiment, the geometry engine 206 generates an overlay of the received form images. The geometry engine 206 identifies sets of strokes that overlap each other in the overlay based on the position information and classifies them into a group of the strokes. The geometry geometric engine 206 designates the area encompassed by the group of overlapping strokes as a field in the form images as it infers that the area is used by the users for filling out information.

The geometry engine 206 generates a field bounding box that encompasses the group of overlapping strokes based on the size and position of the stroke bounding boxes of each set of strokes in the group of overlapping strokes. In one embodiment, the geometry engine 206 determines the center of the field bounding box by determining the average position (for example, geometric mean, harmonic mean, median, mode, etc.) of the stroke bounding boxes. In one embodiment, the geometry engine 206 determines the size of the field bounding box by determining the average size (for example, the geometric mean, harmonic mean, median, mode, etc.) of the stroke bounding boxes. The geometry engine 206 removes outliers, for example, by excluding stroke bounding boxes that would result in a field bounding box that is more than twice the size of the average stroke bounding box. In another embodiment, the geometry engine 206 determines the size of the largest stroke bounding box as the size of the field bounding box.

In one embodiment, geometry engine 206 identifies a geometric shape (for example, a line, a circle, a square, a rectangle, etc. that is traditionally used to fill out information in forms) from the overlay of the form images. The geometry engine 206 then generates a field bounding box that encompasses the geometric shape. In a further embodiment, the geometry engine 206 generates a field bounding box that encompasses the geometric shape and the group of overlapping strokes that is closest to the geometric shape.

Figure 5C:
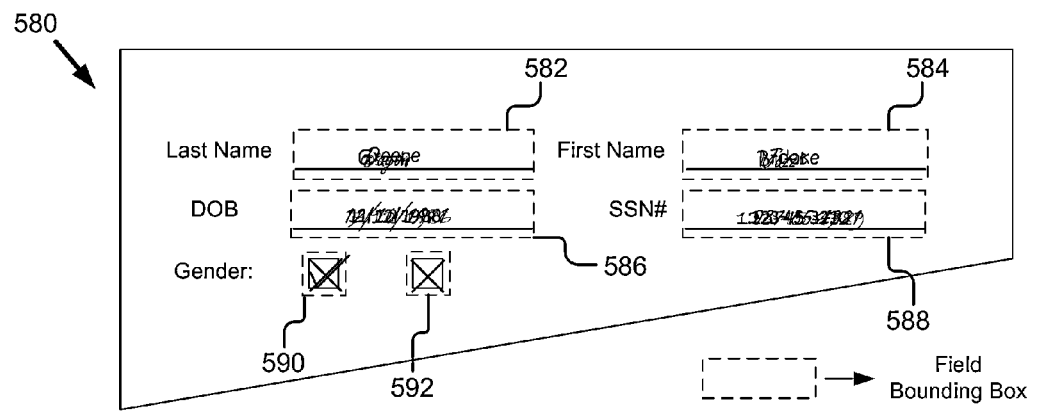
FIG. 5C is a graphic representation of an overlay of form images including field bounding boxes encompassing groups of strokes and geometric shapes.

Referring now to FIGS. 5A-5D, the above described process for generating field bounding boxes is illustrated. FIG. 5A illustrates a graphic representation of an overlay 500 of the three form images 400, 440, 480 from FIGS. 4A-4C. The geometry engine 206 identifies groups of strokes 505, 510, 515, 520, 525, 530 where the sets of strokes in each group overlap each other in the overlay. For example, the group of overlapping strokes 505 includes the set of strokes representing Oscar 405 (see FIG. 4A) and the set of strokes representing Dagon 445 (see FIG. 4B). FIG. 5B illustrates one embodiment of a graphic representation for the overlay 540 of the form images including field bounding boxes. The geometry engine 206 generates field bounding boxes, 545, 550, 555, 560, 565, 570 for each of the identified groups of overlapping strokes 505, 510, 515, 520, 525, 530, respectively.

FIG. 5C illustrates another embodiment of a graphic representation for the overlay 580 of the form images including field bounding boxes. The geometry engine 206 generates bounding boxes 582, 584, 586, 588, 590, 592 that encompass the geometric shapes and the groups of overlapping strokes 505, 510, 515, 520, 525, 530 that are identified from the overlay of the form images.

Figure 5D:
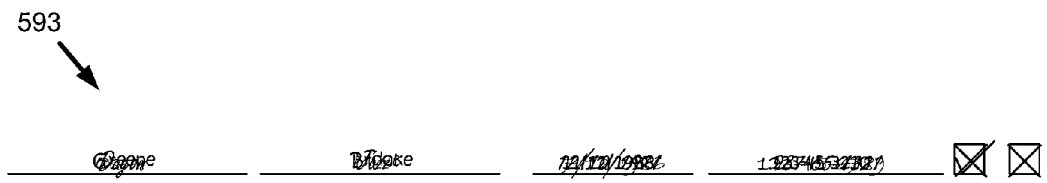
FIG. 5D is a graphic representation of an overlay of form images arranged as a TOW.

FIG. 5D illustrates another embodiment of a graphic representation for the overlay 593 where each of the field bounding boxes in a form are organized as a row according to the reading order of the form (i.e. the order in which a person would complete the form by moving from left to right).

Turning back to FIG. 2, in another embodiment, the geometry engine 206 processes the received form images individually to generate the field bounding box. In this embodiment, the geometry engine 206 generates a field bounding box based on the size and position of a first stroke bounding box encompassing a set of strokes in a first form image. The geometry engine 206 then determines if the position of a second stroke bounding box encompassing a set of strokes in a second form image matches or overlaps the position of the field bounding box. If there is a match or an overlap, the geometry engine 206 expands the size of the field bounding box to encompass the second stroke bounding box of the second form image. The geometry engine 206 repeats the process for all the received form images.

In one embodiment, the geometry engine 206 generates the field bounding box based on timing information of the strokes received as metadata with the form images. For example, the geometry engine 206 determines the sets of strokes that were filled out first in each of the three form images 400, 440, 480 and generates a field bounding box based on the size and position of the stroke bounding boxes encompassing the sets of strokes.

In one embodiment, the geometry engine 206 identifies a stroke in a form image that does not have any overlapping strokes in the overlay of form images. In one embodiment, if the size of the stroke is smaller than a threshold, the geometry engine 206 identifies the stroke as a stray marking. In a further embodiment, if the distance between the stroke and the closest field bounding box exceeds a threshold, the geometry engine 206 identifies the stroke as a stray marking. For example, the geometry engine 206 identifies a small stroke 413 (see FIG. 4A and FIG. 5A) near the margin of form image 400 as a stray marking. The geometry engine 206 then removes stray markings from the form image.

In another embodiment, the geometry engine 206 identifies outliers and removes them from the field bounding box. For example, if a user wrote text that overlaps with the field that would substantially increase the dimensions of the bounding box (e.g. by discarding outliers that are more than twice the size of the bounding box), the geometry engine 206 ignores the extraneous text. In one embodiment, the geometry engine 206 identifies a set of strokes in a form image that does not have any overlapping strokes in the overlay of form images. The geometry engine 206 designates the set of strokes as a note created by the user that submitted the form image, if the size of the set of strokes is larger than a threshold and/or if the distance between the set of strokes and the closest field bounding box exceeds a threshold. The geometry engine 206 generates a note image and sends it to the table generator 210.

In one embodiment, the geometry engine 206 receives printed form images and position information of the strokes in each printed form image from the image processor 214. The geometry engine 206 generates the field bounding boxes and removes stray markings from the printed form images, similar to the processing of the form images described above.

Once a field bounding box representing a field in the form images is generated, the geometry engine 206 generates field images that include strokes from each of the received form images based on the size and the position of the generated field bounding box. For example, the geometry engine 206 crops a field image that includes the set of strokes Oscar 405 (see FIG. 4A) from the form image 400 and another field image that includes the set of strokes Dagon 445 (see FIG. 4B) from the form image 440 based on the size and position of the field bounding box 545 (see FIG. 5A). Similarly, the geometry engine 206 crops and generates field images from the form images for each of the generated field bounding boxes. The geometry engine 206 then sends the form images, the field images and the position of the field images (i.e., the position of the field bounding box) within the form images to the label detector 208 and the table generator 210. In another embodiment, the geometry engine 206 saves the stroke metadata from all the strokes on each form that intersected the field bounding box and stores the stroke metadata in the data storage 255.

The label detector 208 is software and routines for identifying a label for a field image and generating a label image. In one embodiment, the label detector 208 is a set of instructions executable by the processor 240 to provide the functionality described below for identifying a label for a field image and generating a label image. In another embodiment, the label detector 208 is stored in the memory 245 and is accessible and executable by the processor 240. In either embodiment, the label detector 208 is adapted for cooperation and communication with the processor 240, the geometry engine 206, the table generator 210 and other components of the IBDM server 106 via the bus 220.

The label detector 208 receives form images and the field images associated with a field in the form images from the geometry engine 206. The label detector 208 also receives the position of the field images in the corresponding form images from the geometry engine 206. The label detector 208, based on the position of a field image, analyzes an area around (for example, to the left, right, top, bottom, etc.) a field image in the form image to identify a group of related pixels. The label detector 208 assigns the group of related pixels as the label for the field associated with the field image. The group of related pixels can represent any form of text, for example, one or more letters, one or more words, one or more numbers, punctuation marks, a symbol (for example: +, >, =, etc.), a logo, etc. Identifying characters and words in an image is a common preprocessing step in OCR and is well understood by persons with ordinary skill in the art. In one embodiment, the label detector 208 receives an unmarked form image and identifies a letter or punctuation by determining one or more sets of pixels that are connected based on the pixel intensity, color, etc. The label detector 208 then identifies a word based on, for example, the spacing between sets of connected pixels. In one embodiment, if the label detector 208 identifies more than one group of related pixels in the form image, the label detector assigns the group which is closest to the field image as the label. Segmenting letters and words is one of the first tasks in most OCR systems and is well understood.

Once the label is identified, in one embodiment, the label detector 208 generates a label image that includes the identified label from the unmarked form image. For example, the label detector 208 analyzes an area around the field image including the set of strokes Oscar 405 (see FIG. 4A) in the form image 400 and crops a label image that includes "Last Name." In one embodiment, the label detector 208 crops a label image from each of the received form images. In one embodiment, the label detector 208 then selects one label image to be associated with all field images based on the clarity of the label, noise in the label image, etc. The label detector 208 then sends the label image and the associated field to the table generator 210. In another embodiment, the label detector 208 crops the label image from the unmarked original form image that is included as metadata with the received form image.

The table generator 210 is software and routines for indexing the form images, the field images and the label images in the data storage 255. In one embodiment, the table generator 210 is a set of instructions executable by the processor 240 to provide the functionality described below for indexing the form images, the field images and the label images in the data storage 255. In another embodiment, the table generator 210 is stored in the memory 245 and is accessible and executable by the processor 240. In either embodiment, the table generator 210 is adapted for cooperation and communication with the processor 240, the data storage 255, the controller 202, the geometry engine 206, the label detector 208, the symbolic representation module 212, the user interface engine 216 and other components of the IBDM server 106 via the bus 220.

The table generator 210 receives the form images, the field images and the position of each field image in the corresponding form image from the geometry engine 206. The table generator 210 indexes each form image with the field images that were generated from the form image. For example, the table generator 210 indexes the field image including the set of strokes Oscar 405 (see FIG. 4A) and the field image including the set of strokes Mike 410 (see FIG. 4A) with the form image 400. In one embodiment, the table generator 210 receives a note image that is identified in a form image by the geometry engine 206 and indexes the note image with the corresponding form image. The table generator 210 also the indexes the position of each field image within the form image with the field images. The table generator 210 also indexes field images based on the fields identified in the form images. For example, the table generator 210 indexes the form image including the set of strokes Oscar 405 (see FIG. 4A) and the field image including the set of strokes Dagon 445 (see FIG. 4B) as being associated with the same field.

The table generator 210 also receives label images for each identified field in the form images from the label detector 208. The table generator 210 indexes the label image with the field images associated with the field. For example, the table generator 210 indexes the label image including "Last Name" with the field images including the sets of strokes Oscar 405 and Dagon 445 (see FIGS. 4A-4B). In one embodiment, the table generator 210 sends a request to the symbolic representation module 212 to generate a symbolic version of the label and receives a symbolic version of the label or a new label image that includes the symbolic version of the label as associated metadata. The table generator 210 also indexes the new label image with the associated field images.

In one embodiment, the table generator 210 also associates one or more fields identified from the form images. The table generator 210 retrieves a first set of field images that are indexed with a first field and a second set of field images that are indexed with a second field from the data storage 255. The table generator 210 analyzes the first set of field images and the second set of field images to determine whether the first field is associated with the second field. In one embodiment, the table generator 210 analyzes a geometric relationship based on the position of the first set of field images and the position of the second set of field images. For example the table generator 210 associates the first field with the second field in the data storage 255 if the distance between the positions is below a threshold. For example, fields that are closer to each other than other fields are recognized by the table generator 210 as being associated. In another example, the table generator 210 associates the first field with the second field based on the alignment (for example, vertically aligned or horizontally aligned, etc.) of the field images. In another embodiment, the table generator 210 determines a pattern of stroke usage by analyzing the strokes in the first and second set of field images. The table generator 210 associates the first field with the second field if the table generator 210 determines the pattern of stroke usage as being mutually exclusive, such as when the label is for gender and the fields are male and female.

In yet another embodiment, the table generator 210 analyzes the label images for the first field and the second field. The table generator 210 associates the first field and the second field based on the analysis of the label images. In one embodiment, the table generator 210 determines whether the label images include groups of pixels that represent a similar type of text. For example, the table generator 210 associates the first field with the second field if both label images include pixels representing a single alphabet (for example, M and F), numbers, a mathematical symbol (for example, ">" and "<"), etc. In a further embodiment, the table generator 210 analyzes the label matches and/or the new label images of the label images that are received from the symbolic representation module 212. For example, if both the new label images belong to a known set, for instance if they include names of different car brands, the table generator 210 associates the first field with the second field. In a further embodiment, the table generator 210 also designates the first field and the second field as radio buttons based on the analyses described above.

In one embodiment, once the first field and the second field are determined to be associated, the table generator 210 instructs the label detector 208 to determine a master label image for the first field and the second field. In this embodiment, the label detector 208 analyzes a larger area in the form images based on the position of the first set of field images and the second set of field images. The label detector 208 identifies a new group of related pixels as the master label and generates a master label image. For example, the table generator 210 associates a first field with the label image "Male" and a second field with the label image "Female." In this example, the label detector 208 analyzes the form images to generate a master label image that includes a group of related pixels representing "Gender." The table generator 210 receives the master label image and indexes it with the first set of field images and the second set of field images.

The symbolic representation module 212 is software and routines for generating symbolic information for label images and field images. In one embodiment, the symbolic representation module 212 is a set of instructions executable by the processor 240 to provide the functionality described below for generating symbolic information for label images and field images. In another embodiment, the symbolic representation module 212 is stored in the memory 245 and is accessible and executable by the processor 240. In either embodiment, the symbolic representation module 212 is adapted for cooperation and communication with the processor 240, the data storage 255, the table generator 210 and other components of the IBDM server 106 via the bus 220.

In one embodiment, the symbolic representation module 212 receives a label image from the table generator 210. The symbolic representation module 212 generates symbolic information (for example, machine encoded text such as American Standard Code for Information Exchange (ASCII)) for the label image by performing, for example, Optical Character Recognition (OCR), Optical Mark Recognition (OMR), handwriting recognition, pattern recognition, etc. The symbolic representation module 212 determines a dictionary match for the label image from a classification dictionary and indexes the dictionary match as the symbolic information for the label image. In one embodiment, the symbolic representation module 212 uses pattern recognition techniques well known to those with ordinary skill in the art to classify the label image and match the label image to the closest word or other object in the classification dictionary. The dictionary match can be used to assign the symbolic information to the label image. For example, if the label image is an image of the word "Date" and the word "Date" is contained in the classification dictionary, the symbolic representation module 212 would assign the dictionary entry for the word "Date" as the symbolic information for the label image and indexes the symbolic information for the word "Date" with the label image in data storage 225. The classification dictionary is a part of the data storage 255.

The symbolic representation module 212 optionally generates a new label image with the symbolic information and sends the new label image to the table generator 210. In one embodiment, the symbolic representation module 212 then determines a label match for the label image from a label database in the data storage 255. The label database includes labels that are commonly used in forms for example, tax forms, a visa application, medical insurance forms, etc. For example, the symbolic representation module 212 identifies "Date of Birth:" as the label match for the label image representing "DOB" (see FIG. 4A). In this embodiment, the symbolic representation module 212 sends a new label image generated using the label match to the table generator 210.

In one embodiment, the symbolic representation module 212 receives a request from the table generator 210 for generating symbolic information for a set of field images associated with a field. In this embodiment, the symbolic representation module 212 retrieves the symbolic information of the label image associated with the field. The symbolic representation module 212 then generates symbolic information for the set of field images based on the symbolic information of the label image for the field. In one embodiment, the symbolic representation module 212 determines a subset from the classification dictionary based on the symbolic information of the label image. The symbolic representation module 212 then generates symbolic information for the set of field images by restricting the process of classifying the set of field images and determining dictionary matches, to the subset of the classification dictionary. In the above described example, since the label match is determined as Date of Birth, the symbolic representation module 212 limits the vocabulary for generating of symbolic information for the field images to names of months and their abbreviations (for example, April, February, etc.), symbols (for example, "-", "/", etc.) and numbers. Alternatively, the symbolic representation module 212 identifies the label as having a particular industry context and limits the vocabulary according to the industry. For example, the symbolic representation module 212 identifies the label as being associated with a medical application because the label is asking about previous conditions. As a result, the symbolic representation module 212 applies a medical vocabulary to the field, such as looking for words like diabetes and heart disease instead of all available words.

The IBDM server 106 is advantageous as it increases the speed by reducing the amount of information that is symbolically generated by the symbolic representation module 212. The symbolic representation module 212 is further advantageous because, for example, if a user requests to generate symbolic information for a single field in a set of form images, the symbolic representation module 212 generates symbolic information for the field images associated with the field instead of generating symbolic information for the entire set of form images. Additionally, since the symbolic representation module 212 generates symbolic information for a set of field images based on the symbolic information of the corresponding label image, the symbolic representation module 212 has higher accuracy than traditional methods for generating symbolic information.

The image processor 214 is software and routines for generating resultant images for identifying strokes in the printed form images. In one embodiment, the image processor 214 is a set of instructions executable by the processor 240 to provide the functionality described below for generating resultant images for identifying strokes in the printed form images. In another embodiment, the image processor 214 is stored in the memory 245 and is accessible and executable by the processor 240. In either embodiment, the image processor 214 is adapted for cooperation and communication with the processor 240, the controller 202, the geometry engine 206 and other components of the IBDM server 106 via the bus 220.

The image processor 214 receives printed form images including strokes from the controller 202. The received printed form images also include an unmarked printed form image (i.e., an image of the printed form without any strokes) as metadata. The image processor 214 generates a resultant image for each printed form image by, for example, first aligning the marked and unmarked printed form images and then subtracting the unmarked printed form image from the printed form image. Thus, the resultant image includes only the pixels that represent strokes without the pixels that represent labels, shapes, etc. The image processor 214 then identifies the position of each stroke within the corresponding printed form image using the resultant image. The image processor 214 then sends the printed form images and the position of each stroke in the corresponding printed form image to the geometry engine 206. In one embodiment, prior to generating the resultant image, the image processor 214 processes the printed form images and the unmarked printed form image for noise removal, deskewing, shadow removal, orientation correction, blur removal, etc.

The user interface engine 216 is software and routines for generating graphical data for displaying a user interface. In one embodiment, the user interface engine 216 is a set of instructions executable by the processor 240 to provide the functionality described below for generating graphical data for displaying a user interface. In another embodiment, the user interface engine 216 is stored in the memory 245 and is accessible and executable by the processor 240. In either embodiment, the user interface engine 216 is adapted for cooperation and communication with the processor 240, the controller 202, the table generator 210 and other components of the IBDM server 106 via the bus 220.

In one embodiment, the user interface engine 216 receives an instruction including field images and label images from the table generator 210. The user interface engine 216 generates graphical data for displaying the field images and the label images as a table for the user device 103. In another embodiment, the user interface engine 216 receives instructions to generate graphical data, such as forms, for the portable computing device 103. Once the graphical data is generated, the controller 202 transmits the graphical data to the user device 103 via the communication unit 250. A display device (not shown) coupled to the user device 103 renders the graphical data and displays the table to a user.

In one embodiment, the user interface engine 216 receives a request for viewing form images from the controller 202. The user interface engine 216 retrieves the field images and the label images that are indexed with the requested form images from the data storage 255. The user interface engine 216 then provides graphical data for displaying a user interface that includes the retrieved field images and label images in a table.

Figure 6:
FIG. 6 is a graphic representation of an example table that includes a plurality of form images.

Referring now to FIG. 6, a graphic representation of a user interface 600 that includes a plurality of form images in a table. In the illustrated example, the table generator 210 receives a request for viewing a plurality of form images from the user device 103 and instructs the user interface engine 216 to generate graphical data for providing the table. Each row in the table includes the field images generated from a single form image. For example, the cells in row 605 of the table comprise field images generated from the form image 400 (see FIG. 4A). The user interface engine 216 arranges the cells in each row such that each column of the table comprises field images that are associated with a single field. The user interface engine 216 then places the label image 610 associated with the field as the column header.

Methods

Figure 7:
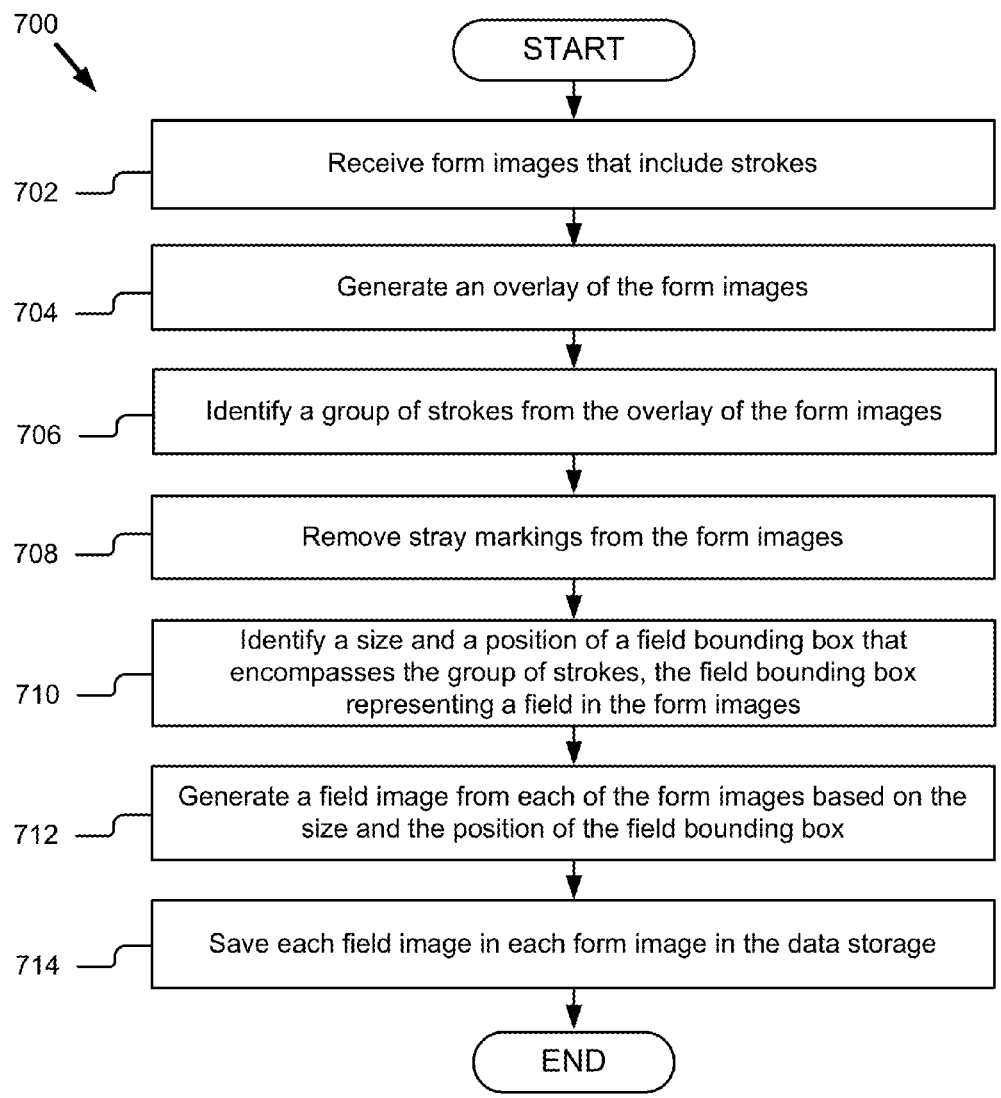
FIG. 7 is a flow diagram of one embodiment of a method for identifying a field in form images.

Referring now to FIGS. 7-10, various embodiments of the methods of the invention will be described. FIG. 7 is a flow diagram 700 of a method for identifying a field in the form images according to one embodiment. The IMBD server 106 includes a controller 202, a stroke identification module 204, a geometry engine 206, a label detector 208, a table generator 210, a symbolic representation module 212, an image processor 214 and a user interface engine 216. The stroke identification module 204 receives 702 form images that include strokes from the portable computing device 102 via the controller 202. The stroke identification module 204 identifies the position of each stroke in each of the received form images. The stroke identification module 204 then determines sets of strokes in each of the received form images and generates stroke bounding boxes. The geometry engine 206 generates 704 an overlay of the form images. For example, the geometry engine 206 generates an overlay of signatures from the first field in the form images. In one embodiment, the geometry engine 206 generating a first bounding box on a first form, generating a second bounding box on a second form, determining that the first and second bounding boxes overlap and generating the field bounding box as an average of the first and second bounding boxes. The geometry engine 206 then identifies 706 a group of strokes from the overlay of the form images. For example, the geometry engine 206 identifies the group of strokes that overlap each other based on the position of the stroke bounding boxes. The geometry engine 206 also removes 708 stray markings from the form images. The geometry engine 206 then identifies 710 a size and a position of a field bounding box that encompasses the group of strokes, the field bounding box representing a field in the form images. The geometry engine 206 then generates 712 a field image from each of the form images based on the size and the position of the field bounding box. In one embodiment, the generating step includes cropping a field image from each of the form images. The table generator 210 saves 714 each field image in each form image in the data storage 255. In another embodiment, the user device 103 can generate the field images with strokes for each cell in the table by receiving stroke metadata from the IBDM server 106. In another embodiment, the table generator 210 indexes the field images with the corresponding form image in the data storage 255.

Figure 8:
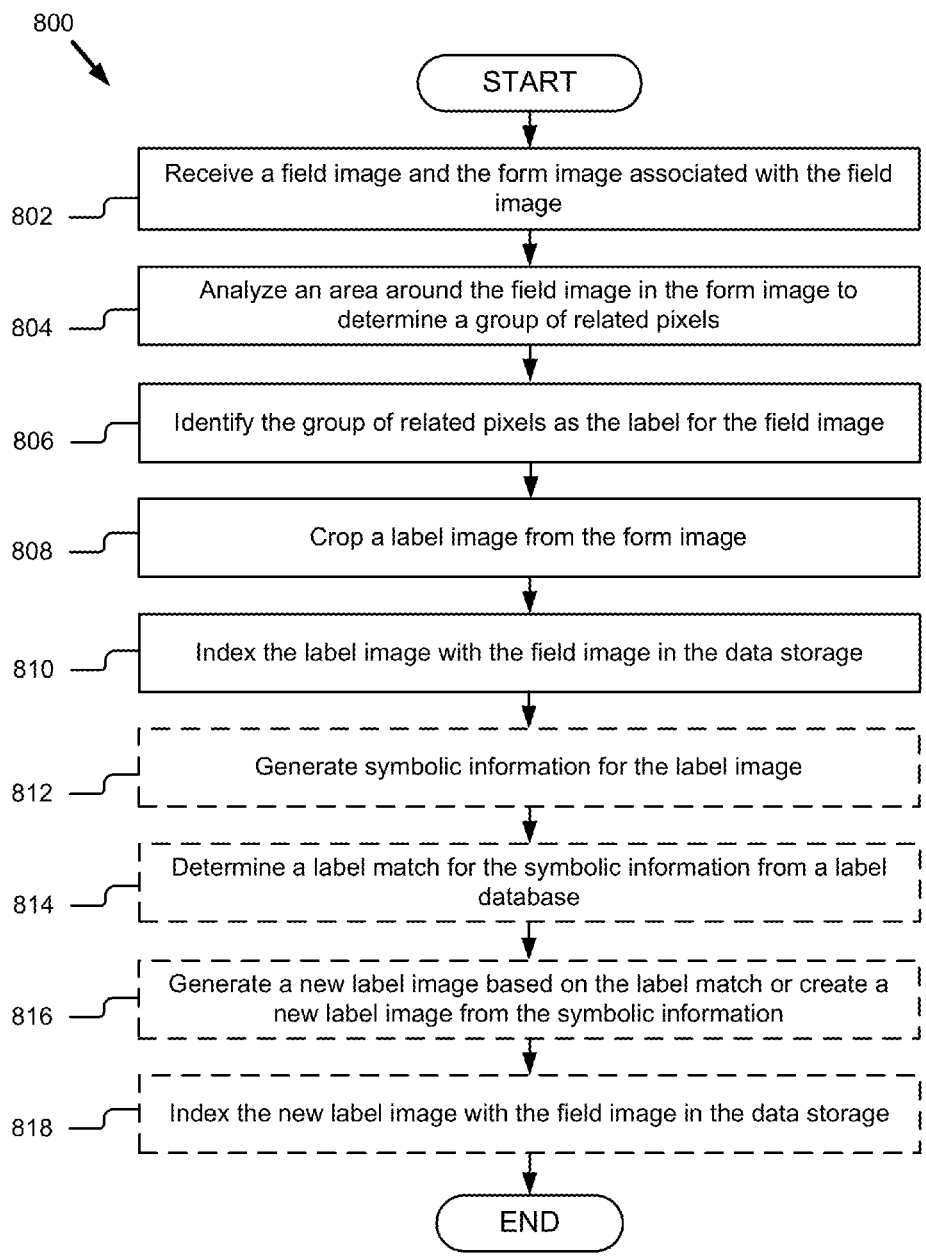
FIG. 8 is a flow diagram of one embodiment of a method for generating a label image for a field image.

FIG. 8 is a flow diagram 800 of a method for generating a label image for a field image according to one embodiment. The label detector 208 receives 802 a field image and the form image associated with the field image from the geometry engine 206. The label detector 208 analyzes 804 an area around the field image in the form image to determine a group of related pixels. For example, the label detector 208 identifies pixels that are to the left, right, above or below the field image. The label detector 208 identifies 806 the group of related pixels as the label for the field image. For example, the label detector 208 identifies a single letter to the left of the field image as being the label for a box. The label detector 208 then crops 808 a label image from the form image. The table generator 210 indexes 810 the label image with the field image in the data storage 255.

In an optional embodiment, the symbolic representation module 212 generates 812 symbolic information for the label image. For example, the symbolic representation module 212 performs OCR or OMR on the label image. The symbolic representation module 212 determines 814 a label match for the symbolic information from a label database. In one embodiment, the label database is part of the data storage 255. The symbolic representation module 212 then generates 816 a new label image based on the label match or creates the new label image from the symbolic information directly. The table generator 210 indexes 818 the new label image with the field image in the data storage 255. Once the field images and the label images are identified and indexed, the table generator 210 generates a table and instructs the user interface engine 216 to generate graphical data for displaying the table in a user interface.

Figure 9:
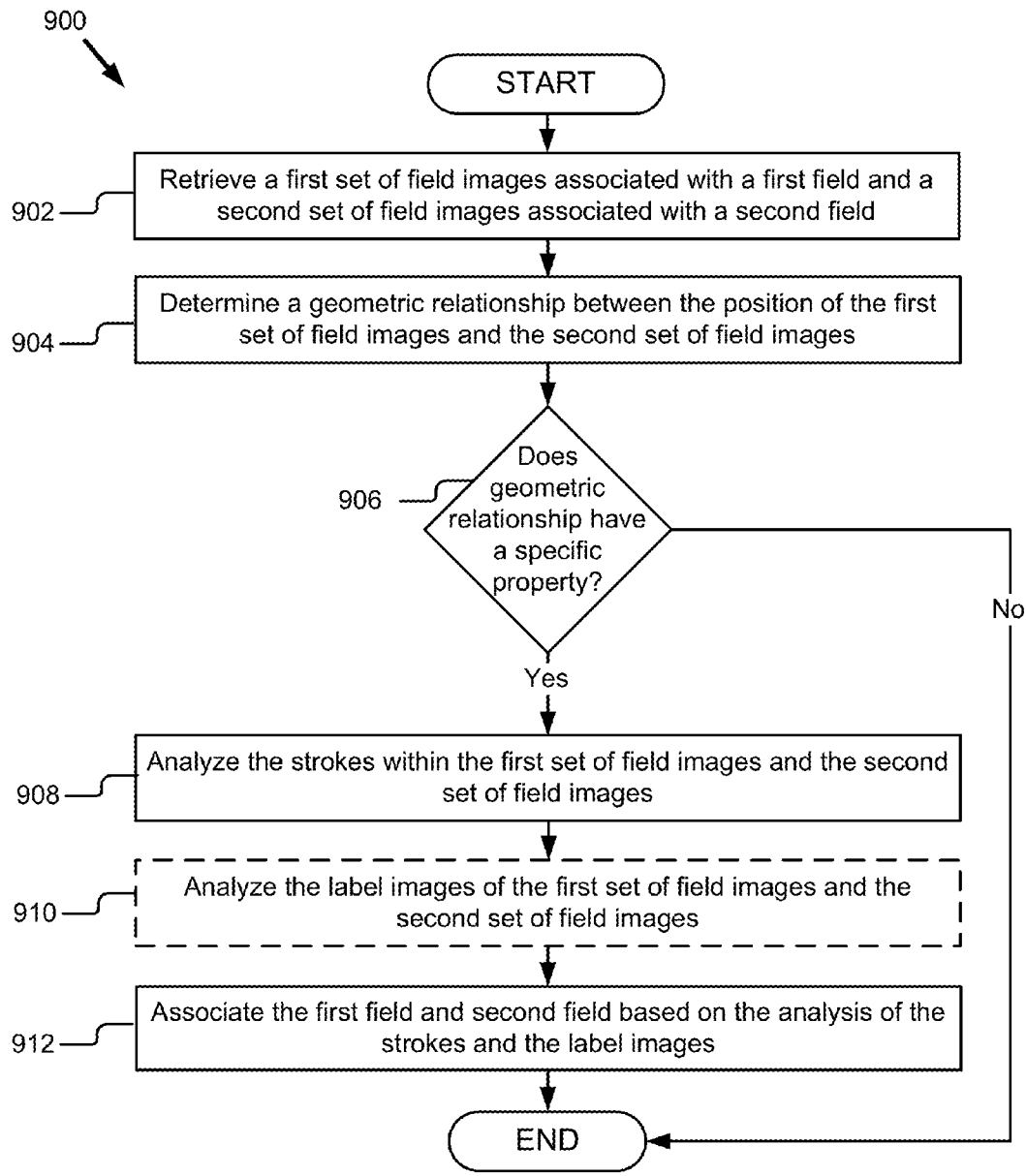
FIG. 9 is a flow diagram of one embodiment of a method for associating fields of a form.

FIG. 9 is a flow diagram 900 of a method for associating fields in form images according to one embodiment. The table generator 210 retrieves 902 a first set of field images associated with a first field and a second set of field images associated with a second field from the data storage 255. For example, the table generator 210 retrieves a first set of field images of a box for checking male and a second set of field images of a box for checking female. The table generator 210 determines 904 a geometric relationship between the position of the first set of field images and the second set of field images. The table generator 210 then determines 906 whether the geometric relationship has a specific property. For example, the table generator 210 determines whether a distance between the positions is below a threshold, whether the positions are vertically aligned or horizontally aligned, etc. If, for instance, the distance is below the threshold, the table generator 210 determines that the fields are related or possibly related. For example, if the male and female boxes are close enough together, they are possibly related.

The method proceeds to analyzing 908 the strokes within the first set of field images and the second set of field images. For example, the table generator 210 analyzes the strokes to determine a pattern of stroke usage. The table generator 210 also optionally analyzes 910 the label images of the first set of field images and the second set of field images. The table generator 210 then associates 912 the first field and the second field based on the analysis of the strokes and the label images. For example, the table generator 210 associates the first field and the second field as radio buttons if the table generator determines if the pattern of stroke usage as mutually exclusive. Persons of ordinary skill in the art will recognize that this method could be expanded to an additional number of field images, such as radio buttons for indicating that the user is single, married, widowed or divorced.

Figure 10:
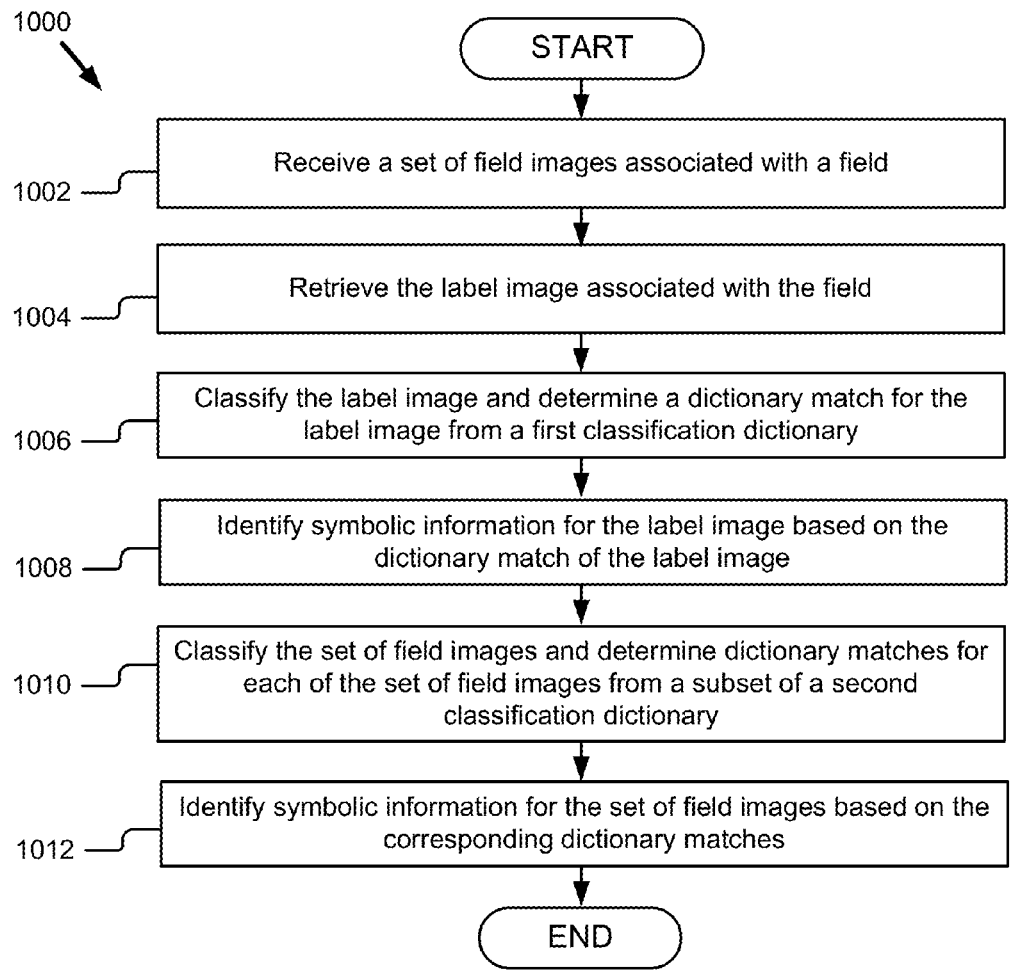
FIG. 10 is a flow diagram of one embodiment of a method for generating symbolic information for field images.

FIG. 10 is a flow diagram 1000 of a method for generating symbolic information for field images. The symbolic representation module 212 receives 1002 a set of field images associated with a field. The symbolic representation module 212 then retrieves 1004 the label image associated with the field. The symbolic representation module 212 classifies 1006 the label image and determines a dictionary match for the label image from a first classification dictionary. For example, the symbolic representation module 212 classifies the label image using a dictionary of known English words or a known alphabet using OCR techniques, pattern matching techniques, etc. In one embodiment, there are separate classification dictionaries based on the nature of the label image, such as classification dictionaries for each language of the form or a medical terms dictionary based on OCR of typeset characters. The symbolic representation module 212 identifies 1008 symbolic information for the label image based on the dictionary match of the label image.

The symbolic representation module 212 classifies 1010 the set of field images and determines dictionary matches for each of the set of field images from a subset of a second classification dictionary. The second classification dictionary could be the same as the first classification dictionary that includes dictionary matches for label images or it could be a separate classification dictionary. In one example, the symbolic representation module 212 identifies that the label is for a "date of birth" and, as a result, limits the recognition process to identifying numbers, names and abbreviations of months and symbols. In yet another example, if the label says "Soc Sec Num" the symbolic representation module 212 identifies numbers and symbols. If the label is a state of being, such as "male" or "widowed," the symbolic representation module 212 identifies checks and X's. The symbolic representation module 212 then identifies 1012 symbolic information for the set of field images based on corresponding dictionary matches.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the in the following claims.

What is claimed is:

1. A computer-implemented method for identifying a field in each of a plurality of form images, the method comprising:
   receiving, at one or more processors, the plurality of form images, each form image including a plurality of strokes;
   generating, with the one or more processors, a stroke bounding box for each set of strokes identified in the plurality of form images based on a distance between strokes being within a threshold, each stroke bounding box encompassing a corresponding set of strokes and having associated size and position information;
   generating, with the one or more processors, an overlay of the plurality of form images;
   identifying, with the one or more processors, a group of overlapping strokes from the overlay of the plurality of form images by identifying sets of strokes that overlap each other in the overlay based on stroke bounding box size and position information;
   generating a field bounding box based on an average size and position of stroke bounding boxes associated with the group of overlapping strokes, the field bounding box representing the field in each of the plurality of form images; and
   generating a plurality of field images from the plurality of form images based on the field bounding box.

2. The method of claim 1, wherein
   the average size and position of stroke bounding boxes associated with the group of overlapping strokes is determined as one of a geometric mean, a harmonic mean, a median, or a mode.

3. The method of claim 1, further comprising:
   identifying a geometric shape from the overlay of the plurality of form images; and
   generating the field bounding box encompassing at least one of the geometric shape and the group of overlapping strokes.

4. The method of claim 1, further comprising generating each of the plurality of field images based on at least one of a size and a position of the field bounding box.

5. The method of claim 1, further comprising:
   analyzing an area around the plurality of field images in the plurality of form images to determine groups of related pixels;
   identifying a label for the plurality of field images from the groups of related pixels; and
   generating a label image from at least one of the plurality of form images.

6. The method of claim 5, further comprising identifying the label based on a distance of the group of related pixels to each of the plurality of field images.

7. The method of claim 5, further comprising indexing the label image with the plurality of field images.

8. The method of claim 1, further comprising removing stray markings from the plurality of form images.

9. A system for identifying a field in each of a plurality of form images, the system comprising:
   one or more processors;
   a stroke identification module stored on a memory and executable by the one or more processors, the stroke identification module for receiving the plurality of form images, each form image including a plurality of strokes, and generating a stroke bounding box for each set of strokes identified in the plurality of form images based on a distance between strokes being within a threshold, each stroke bounding box encompassing a corresponding set of strokes and having associated size and position information;
   a geometry engine coupled to the stroke identification module, the geometry engine for generating an overlay of the plurality of form images, identifying a group of overlapping strokes from the overlay of the plurality of form images by identifying sets of strokes that overlap each other in the overlay based on stroke bounding box size and position information, generating a field bounding box based on an average size and position of stroke bounding boxes associated with the group of overlapping strokes, the field bounding box representing the field in each of the plurality of form images and generating a plurality of field images from the plurality of form images based on the field bounding box.

10. The system of claim 9, wherein the geometry engine determines the average size and position of stroke bounding boxes associated with the group of overlapping strokes as one of a geometric mean, a harmonic mean, a median, or a mode.

11. The system of claim 9, wherein the geometry engine identifies a geometric shape from the overlay of the plurality of form images and generates the field bounding box encompassing at least one of the geometric shape and the group of overlapping strokes.

12. The system of claim 9, wherein the geometry engine generates each of the plurality of field images based on at least one of a size and a position of the field bounding box.

13. The system of claim 9, further comprising a label detector coupled to the geometry engine, the label detector for analyzing an area around the plurality of field images in the plurality of form images to determine groups of related pixels, identifying a label for the plurality of field images from the groups of related pixels and generating a label image from at least one of the plurality of form images.

14. The system of claim 13, wherein the label detector identifies the label based on a distance of the group of related pixels to each of the plurality of field images.

15. The system of claim 13, further comprising a table generator coupled to the geometry engine and the label detector, the table generator for indexing the label image with the plurality of field images.

16. The system of claim 9, wherein the geometry engine removes stray markings from the plurality of form images.

17. A computer program product comprising a non-transitory computer useable medium including a computer readable program, wherein the computer readable program when executed on a computer causes the computer to:
   receive a plurality of form images, each form image including a plurality of strokes;
   generate a stroke bounding box for each set of strokes identified in the plurality of form images based on a distance between strokes being within a threshold, each stroke bounding box encompassing a corresponding set of strokes and having associated size and position information;
   generate an overlay of the plurality of form images;
   identify a group of overlapping strokes from the overlay of the plurality of form images by identifying sets of strokes that overlap each other in the overlay based on stroke bounding box size and position information;
   generate a field bounding box based on an average size and position of stroke bounding boxes associated with the group of overlapping strokes, the field bounding box representing a field in each of the plurality of form images; and generate a plurality of field images from the plurality of form images based on the field bounding box.

18. The computer program product of claim 17, wherein the average size and position of stroke bounding boxes associated with the group of overlapping strokes is determined as one of a geometric mean, a harmonic mean, a median, or a mode.

19. The computer program product of claim 17, further causing the computer to:

identify a geometric shape from the overlay of the plurality of form images; and generate the field bounding box encompassing at least one of the geometric shape and the group of overlapping strokes.

20. The computer program product of claim 17, further causing the computer to:

analyze an area around the plurality of field images in the plurality of form images to determine groups of related pixels;

identify a label for the plurality of field images from the groups of related pixels; and generate a label image from at least one of the plurality of form images.

* * * * *